United States Patent Office 3,804,944
Patented Apr. 16, 1974

3,804,944
SODIUM DITHIONITE SOLUTION
STABLIZATION
Mearl A. Kise, Portsmouth, and Leonard C. Ellis, Chesapeake, Va., assignors to Virginia Chemicals Inc., Portsmouth, Va.
No Drawing. Continuation of abandoned application Ser. No. 77,730, Oct. 2, 1970. This application May 22, 1972, Ser. No. 255,769
Int. Cl. C01b 17/66
U.S. Cl. 423—265
5 Claims

ABSTRACT OF THE DISCLOSURE

Sodium dithionite in solution is widely used in bleaching and vat dyeing of textiles. Unfortunately, however, losses occur not only through decomposition during dissolving of the salt in question, but also during storage of the solution. In the present method and reaction product, one avoids decomposition and effectively stabilizes various concentration levels of the dithionite solution with caustic soda added at 1.4% to 20% by weight of the sodium dithionite present, the addition being made under controlled conditions. For example, while minimizing air exposure, the pH is generally maintained above 9 and excessive caustic soda addition is avoided. Also, temperature is controlled (to approximately 50° F.) for best effect.

CROSS-REFERENCE TO RELATED APPLICATIONS

This is a continuation application of copending patent application filed on Oct. 2, 1970 under Ser. No. 77,730 in the name of applicants hereunder entitled "Sodium Dithionite Solution Stabilization" and now abandoned.

BACKGROUND OF THE INVENTION

Although the product sodium dithionite under normal storage conditions, moisture being excluded and free circulation of air avoided, can be held without appreciable decomposition for several years, upon dissolution of the product in water, decomposition takes place immediately, unprotected aqueous solutions thereof decomposing immediately upon preparation. As a rule, the decomposition continues to accelerate until all the dithionite has been consumed. Known decomposition reactions of the valuable commercial bleaching compounds are as follows, depending upon the acidic environment, wherein the stronger the acidic condition, the faster the rate of the reaction.

Anaerobic reaction formula:

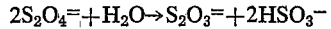

Aerobic reaction formula:

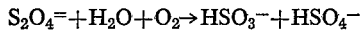

By the very nature of the decomposition reaction products, an acid condition is created through either the aerobic or anaerobic reaction aforesaid. Thus, either of the aforementioned reactions is likely to promote and accelerate further degradation of the sodium dithionite solution. Whereas, aerobic decomposition would not appear to be a serious factor in large storage systems—the depth of oxygen penetrating through the surface of the storage system is not great in comparison to the entire depth—auto-oxidation by anaerobic decomposition is inevitable, regardless of solution depth or volume, per se.

The prior art reveals stabilization by alkaline agents such as sodium carbonate, sodium bicarbonate, and sodium sulfite. However, these efforts generally result in the detrimental presence of excess amounts of alkali Cadmium sulfate as a stabilizer for sodium dithionite, prepared in situ from sodium borohydride and sodium metabisulfite is another known form of stabilization, but as a solution stabilizer, the cadmium ion leads to the yellow cadmium sulfide, deleteriously affecting brightness in a commercial bleaching operation. By virtue of the present additive process, no discoloration is developed.

Known references in the literature include the following: M. Wayman, C. B. Anderson, W. J. Lem and W. H. Rapson, TAPPI, 52(1), 89–92 (1969); M. W. Lister and R. C. Garvie, Can. J. Chem., 37, 1567–1574 (1959).

The present invention is closely related to our copending patent applications as follows: Ser. No. 3,526, filed Jan. 16, 1970, now Pat. No. 3,672,829, and Ser. No. 3,527, filed Jan. 16, 1970, each entitled Sodium Dithionite Solution Stabilization and each having been filed under the names of the present applicants hereunder and now abandoned.

Because sodium dithionite is produced by several processes which contribute significantly different quantities of co-products capable of accelerating the decomposition of dithionite in solution, it is essential that an alkali be used of such strength that it can convert the co-products into components that provide an alkaline reserve while at the same time being capable of providing a specific pH. Actually, it is not sufficient to merely establish a certain pH level; nor is it sufficient herein to introduce a fixed amount of alkali in all cases into a given dithionite solution. To add large excesses of alkali to establish the pH is also not the answer to the problem, as will be demonstrated. There is in realty an optimum pH range to be maintained herein with a sufficient acid consuming reserve, to maintain the desirable pH range over a long period of time, in order to gain the benefits of dithionite solution preservation, the principal objective of invention.

SUMMARY OF THE INVENTION

Various concentrations of sodium dithionite solutions are effectively stabilized herein with caustic soda added on a dithionite weight basis under controlled conditions. Careful temperature and caustic soda control is maintained herein as the optimum percentage of caustic soda, on a sodium dithionite weight basis, and temperature are closely related to the stability during long term storage.

DESCRIPTION OF THE PREFERRED EMBODIMENTS

This method for stabilizing aqueous solutions of sodium dithionite against decomposition is effective in storage and during use of the dithionite solution, provided:

(A) Careful control of the pH is maintained and excessive caustic soda is avoided. The pH of the solution should be controlled between 9 and 13, preferably from 10 to 12. The pH is determined after dilution of the dithionite solution to 10%.

(B) Temperature control is effected. The temperature can be controlled between 35–130° F., but the preferred temperature is 35–50° F. for long term storage.

(C) The concentration of the treated solution is maintained at from 5% to 30% (slurry system), but the preferred sodium dithionite concentration is 5–12%. For example, in a specific solution at the 10% concentration level of sodium dithionite, stability was maintained at 35° F. for 84 days with less than 6% decomposition.

(D) Caustic concentration must also be controlled for effective stabilization. In effect, the sodium dithionite solutions are stabilized herein with 1.38% to 20% caustic soda (based on the sodium dithionite concentration in solution), preferably with 5.5% to 11%, under controlled conditions at the various concentration levels of dithionite as exemplified in Tables I to V herein.

With respect to the addition of caustic, careful attention must be given to its concentration to prevent the occurrence of side reactions between the sodium dithionite and the caustic soda, per se. In one example, the 5% dithionite solution passed through optimum solution stability at 130° F. when treated with 10% caustic soda (added on the basis of the dithionite concentration) under anaerobic conditions. Similar conditions at both 10% and 15% sodium dithionite concentration levels showed maximum stability at 5% to 10% caustic soda (dithionite basis). In all examples, the stability decreased rapidly as the caustic soda concentration was reduced, but as the concentration was increased, decomposition increased rapidly only for the 10% and 15% sodium dithionite solutions, whereas for the 5% solution, the rate remained moderate until the weight concentration of caustic soda became equivalent to the dithionite. Beyond this point, the decomposition accelerated until at 300% caustic soda concentration based on concentration of dithionite, the decomposition was equivalent to an unprotected solution.

EXPERIMENT NO. I

The anaerobic decomposition of 5% sodium dithionite solutions at 122° F. under controlled pH has been evaluated at between pH 6 and 7 wherein the characteristic, rapid decomposition occurred after a period of 40 minutes at the lower pH and 80 minutes at the higher pH 7. In both cases, however, losses during this period and the overall period of 2 hours were of the same magnitude. Upon raising the pH to 8, the sharp break in the decomposition curve was eliminated for 7 hours, at which time, the decomposition was only 10.5%. It is important to note that although the bulk of decomposition for the two runs at lower pH was initiated from the point where 5% of the dithionite had decomposed, this was not true at pH 8 where the break had not occurred even at 10% decomposition.

EXPERIMENT NO. II

In a somewhat similar set of experiments at 122° F. with initial solution concentrations at 15% and 0.83%, respectively, for the dithionite and caustic soda, the initial pH was greater than 9 and the pH was never allowed to drop below 9. Additional caustic soda was metered in to maintain the lower pH control limit, but under these conditions, the decomposition required approximately 22 hours (35% decomposition at this time) before additional caustic was necessary. However, significant decomposition occurred even after addition of the extra caustic soda was started, showing a decrease in dithionite of almost 15% during the next two hours. When controlled at pH 10, the decomposition was steady (only 50% after 39 hours) throughout the test period.

EXPERIMENT NO. III

A 10% solution of sodium dithionite containing 2.5% caustic soda (based on the dithionite salt) was heated at 130° F. for 25 hours with only 1% decomposition. Stabilization was effected by controlling the pH at 10.5 with 20% caustic soda solution. As in the previous study, the initial pH was greater than 10.5 and additional alkali was not needed for 16 hours. After the point where additional caustic soda was first introduced to maintain a controlled pH, there was a steady requirement for alkali, and after a total of 24 hours, decomposition of the sodium dithionite was noted. This decomposition then occurred at a rate of approximately 7% per hour and closely paralleled the rate of caustic soda addition.

TABLES I AND II

In long term storage tests which were initiated to study the combined effects of temperature and caustic soda on sodium dithionite solutions, various concentrations ranging from 30% (slurry system) to 5% sodium dithionite were included. For comparison studies, sodium dithionite was obtained from two different processes—zinc dithionite—Table I and sodium formate—Table II. To make them comparable in storage, it was necessary to adjust each sample of sodium formate-derived dithionite with additional caustic soda to counteract the pH effect of the sodium bisulfite present. Once the adjustment was made, either to raise the pH to 6.5 or preferably 10, the solutions behaved in a comparable manner. Without the adjustment, the storage life of the sodium formate-derived sodium dithionite was shortened considerably. The slurry system (30% $Na_2S_2O_4$) was evaluated at 67°, 50°, and 35° F. with various concentrations of alkali indicated. As noted in Tables I and II, none of the slurry solutions lasted as long as 20 days at 67° F. before exceeding 10% decomposition and all went essentially to extinction after 30 days. Most concentrations of caustic survived the 30 day test at 50° F. but only 5.5% caustic soda (8.24% for the formate-derived $Na_2S_2O_4$) case close (11.7% to 14.2% decomposition) to providing ample stabilization to prevent 10% decomposition after 40 days. At 35° F., however, all tests were successful for 30 days with most showing less than 5% decomposition for the test period.

TABLE I.—SLURRY STORAGE TESTS WITH 30% UNADULTERATED SODIUM DITHIONITE

| Reaction number | Wt. percent NaOH [1] | Storage temp., °F. | Percent decomposition and pH [2] | | | | | | |
|---|---|---|---|---|---|---|---|---|---|
| | | | 10 days | pH | 20 days | pH | 30 days | pH | 40 days | pH |
| 718-228-IA | 5.5 | 67 | [3] 3.9 | 11.9 | 16.1 | 11.8 | 97.6 | 5.9 | | |
| 718-228-IIA | 2.75 | 67 | [3] 2.8 | 11.7 | 90.9 | 6.0 | | | | |
| 718-228-IIIA | 1.38 | 67 | [3] 66.4 | 6.1 | 100.0 | 5.5 | | | | |
| 718-234-IA | 5.5 | 50 | 1.6 | 12.0 | [4] 5.0 | | 5.3 | 12.4 | 11.7 | 12.1 |
| 718-234IIA | 2.75 | 50 | 1.4 | 11.8 | [4] 1.7 | | 4.6 | 11.8 | 97.6 | 5.8 |
| 718-234IIIA | 1.38 | 50 | 0.8 | 11.4 | [4] 2.2 | | 7.1 | 6.8 | 99.4 | 5.4 |
| 718-169-I | 5.5 | 35 | 1.9 | | 3.6 | 12.4 | 3.9 | 12.0 | | |
| 718-169-II | 2.75 | 35 | 2.3 | | 4.1 | 12.1 | 4.5 | 11.8 | | |
| 718-169-III | 1.38 | 35 | 0.7 | | 3.2 | 11.8 | 2.8 | 11.6 | | |

[1] Weight percent based on $Na_2S_2O_4$.
[2] pH taken on sample after dilution to 10%.
[3] Storage time eleven days.
[4] Storage time nineteen days.

TABLE II.—SLURRY STORAGE TESTS WITH 30% FORMATE-DERIVED SODIUM DITHIONITE

| Reaction number | Wt. percent NaOH[1] | Storage temp., °F. | Percent decomposition and pH[2] | | | | | | | |
|---|---|---|---|---|---|---|---|---|---|---|
| | | | 10 days | pH | 20 days | pH | 30 days | pH | 40 days | pH |
| 718-230-IA | [4]8.24 | 67 | 10.9 | 11.6 | [3]22.3 | 8.4 | 100 | 6.0 | | |
| 718-230-II | [4]5.50 | 67 | 8.2 | 11.3 | [3]100 | 5.9 | | | | |
| 718-230-III | [4]4.13 | 67 | 78.2 | 6.0 | [3]100 | 5.8 | | | | |
| 718-232-I | [4]8.24 | 50 | 3.5 | 12.0 | [3]9.8 | 6.8 | 10.2 | 12.6 | 14.2 | 12.4 |
| 718-232-II | [4]5.5 | 50 | 2.4 | 11.9 | [3]7.7 | | 8.6 | 10.7 | 94.5 | 6.0 |
| 718-232-III | [4]4.13 | 50 | 29.2 | 6.6 | [3]62.2 | | 100 | 5.8 | | |
| 718-170-I | 5.50 | 35 | [5]0.0 | | 0.9 | 12.2 | [6]6.2 | 11.8 | | |
| 718-170-II | 2.75 | 35 | [5]27.3 | | 85.6 | 6.0 | | | | |
| 718-193-I | [7]6.51 | 35 | 2.7 | 12.1 | [8]4.0 | 12.0 | 0.0 | 12.4 | | |
| 718-193-II | [7]3.76 | 35 | 0.3 | 11.5 | [8]2.7 | 11.1 | 0.0 | 11.2 | | |
| 718-193-IV | [7]2.39 | 35 | 58.1 | 6.1 | [8]99.7 | 5.9 | | | | |
| 718-198-I | [4]8.24 | 35 | 2.9 | 11.8 | | | 0.0 | 11.6 | | |
| 718-198-II | 1[4]5.50 | 35 | 1.6 | 11.9 | | | 0.0 | 11.7 | | |

[1] Weight percent based on Na₂S₂O₄.
[2] pH taken on sample after dilution to 10%.
[3] Storage time 19 days.
[4] Includes additional caustic to make pH equivalent to 10 before adding "normal" percentages (5.5%, 2.75% and 1.38%) of caustic soda.
[5] Storage time 9 days.
[6] Storage time 31 days.
[7] Includes additional caustic to make pH equivalent to 6.5 before adding "normal" percentages (5.5%, 2.75% and 1.3%) of caustic soda.
[8] Storage time 21 days.

TABLES III AND IV

Upon decreasing the dithionite concentration to 10%, Tables III and IV, there was a corresponding increase in solution stability. Again, maximum stability was maintained at 35° F. with 5.5% or less decomposition after 84 days. As expected, the decomposition increased with temperature and only the zinc dithionite derived sodium dithionite surpassed 50 days with less than 10% decomposition. At 67° F., most solutions had decomposed excessively between 20 and 30 days.

For 5% solutions of sodium dithionite at 35° F., all solutions herein exceeded 30 days with less than 1% decomposition.

TABLE V

When similar tests were evaluated on a 30% slurry made from plant or sodiation liquor containing approximately 18.5% sodium dithionite and 11.5% zinc dithionite derived sodium dithionite, the test results were very comparable. It is worthy of mention here, however, that the plant sodiation liquor often contains sufficient caustic soda to stabilize the solutions at lower temperatures. Also, it should be noted that the 30% slurries require frequent agitation to prevent caking and difficulties in handling.

TABLE III.—SOLUTION STORAGE TESTS WITH ZINC DITHIONITE DERIVED SODIUM DITHIONITE

| Reaction number | Wt. percent Na₂S₂O₄ | Wt. percent NaOH[1] | Storage temp., °F. | Percent decomposition and pH | | | | | | | | | |
|---|---|---|---|---|---|---|---|---|---|---|---|---|---|
| | | | | 10 days | pH | 20 days | pH | 30 days | pH | 40 days | 50 days | 60 days | 84 days |
| 718-262-I | 10 | 5.50 | 67 | 2.0 | 13.1 | 11.5 | 12.7 | 9.9 | 12.4 | [2]17.4 | 96.8 | | |
| 718-262-II | 10 | 2.75 | 67 | 0.0 | 12.6 | 0.0 | 12.5 | 0.0 | 11.9 | 96.6 | | | |
| 718-262-III | 10 | 1.38 | 67 | 0.1 | 11.6 | 0.0 | 11.6 | 96.1 | 5.8 | | | | |
| 718-264-I | 10 | 5.50 | 50 | 0.0 | 13.4 | 8.9 | 12.8 | 0.5 | 12.5 | [2]10.4 | [3]9.4 | | [4]96.0 |
| 718-264-II | 10 | 2.75 | 50 | 0.0 | 12.8 | 0.0 | 12.9 | 0.2 | 12.6 | 3.8 | 5.1 | 2.3 | 3.4 |
| 718-264-III | 10 | 1.35 | 50 | 0.0 | 12.4 | 0.0 | 12.4 | 0.0 | 12.0 | 0.0 | 3.8 | 97.4 | |
| 718-266-I | 10 | 5.50 | 35 | 0.0 | 13.5 | 3.6 | 13.3 | 1.9 | 13.4 | [2]2.4 | [5]0.9 | | [2]2.8 |
| 718-266-II | 10 | 2.75 | 35 | 0.0 | 13.4 | 0.0 | 13.3 | 0.0 | 13.2 | 1.2 | 0.8 | 0.0 | 5.5 |
| 718-266-III | 10 | 1.38 | 35 | 0.0 | 13.0 | 0.0 | 12.9 | 0.0 | 13.0 | 0.4 | 0.0 | 0.0 | 0.0 |
| 718-240-VII | 10 | 11.0 | 67 | 4.1 | 13.5 | [5]11.4 | 12.5 | 14.0 | 12.9 | 20.0 | | | |
| 718-238-VII | 10 | 11.0 | 50 | 1.0 | 13.6 | [5]5.8 | | 8.8 | 12.9 | 13.7 | | | |
| 718-236-VII | 10 | 11.0 | 35 | 0.3 | 13.6 | [6]3.4 | | 0.6 | 13.8 | 2.6 | | | |
| 718-200-I | 5 | 5.50 | 35 | 1.6 | 12.0 | 4.1 | 11.5 | 0.0 | 12.0 | | | | |
| 718-200-II | 5 | 2.75 | 35 | 3.7 | 11.6 | 8.4 | 11.5 | 0.5 | 12.0 | | | | |
| 718-200-III | 5 | 1.38 | 35 | 1.6 | 11.4 | 0.0 | 11.2 | 0.0 | 11.7 | | | | |

[1] Weight percent based on Na₂S₂O₄.
[2] Storage time 35 days.
[3] Storage time 45 days.
[4] Storage time 69 days.
[5] Storage time 18 days.
[6] Storage time 19 days.

TABLE IV.—SOLUTION STORAGE TESTS WITH FORMATE-DERIVED SODIUM DITHIONITE

| Reaction number | Wt. percent Na₂S₂O₄ | Wt. percent NaOH[1] | Storage temp., °F. | Percent decomposition and pH | | | | | | | | |
|---|---|---|---|---|---|---|---|---|---|---|---|---|
| | | | | 10 days | pH | 20 days | pH | 30 days | pH | 40 days | 58 days | 82 days |
| 718-268-I | 10 | 8.24 | 67 | 3.2 | 12.8 | 7.3 | 12.7 | 15.6 | 11.3 | 95.9 | | |
| 718-268-II | 10 | 5.50 | 67 | 1.4 | 12.2 | 79.3 | 6.3 | 100 | 7.9 | | | |
| 718-268-III | 10 | 4.13 | 67 | 99.6 | 5.9 | 100 | 5.7 | | | | | |
| 718-270-I | 10 | 8.24 | 50 | 0.2 | 13.0 | 0.5 | 13.0 | 5.6 | 13.0 | 8.6 | 11.5 | 91.9 |
| 718-270-II | 10 | 5.50 | 50 | 1.7 | 12.5 | 0.0 | 12.4 | 18.8 | 6.9 | 94.6 | | |
| 718-270-III | 10 | 4.13 | 50 | 83.5 | 6.1 | 98.8 | 5.9 | | | | | |
| 718-272-I | 10 | 8.24 | 35 | 0.0 | 13.4 | 0.0 | 13.4 | 4.5 | 13.4 | 6.4 | 2.0 | 5.1 |
| 718-272-II | 10 | 5.50 | 35 | 0.0 | 13.0 | 0.0 | 13.1 | 3.0 | 13.1 | 2.1 | 4.8 | 4.1 |
| 718-272-III | 10 | 4.13 | 35 | 0.0 | 11.8 | 9.6 | 6.8 | 51.9 | 6.3 | 6.8 | | |
| 718-202-I | 5 | 8.24 | 35 | 2.8 | 11.8 | 0.0 | 12.2 | 0.0 | 12.3 | | | |
| 718-202-II | 5 | 5.50 | 35 | 0.7 | 11.7 | 0.0 | 12.0 | 0.0 | 12.0 | | | |
| 718-202-III | 5 | 4.13 | 35 | 3.0 | 11.6 | 0.0 | 11.4 | 0.0 | 11.2 | | | |
| 718-201-I | 5 | 8.24 | 35 | 3.6 | 11.8 | 1.0 | 11.8 | 0.0 | 12.4 | | | |
| 718-201-II | 5 | 5.50 | 35 | 0.0 | 11.8 | 0.0 | 11.7 | 0.0 | 12.1 | | | |
| 718-201-III | 5 | 4.13 | 35 | 0.9 | 11.5 | 1.3 | 11.4 | 0.0 | 11.7 | | | |

[1] Weight percent based on Na₂S₂O₄. Includes additional caustic to make pH equivalent to 10 before adding "normal" percentages (5.5%, 2.75% and 1.38%) of caustic soda.

TABLE V.—SODIUM DITHIONITE SODIATION LIQUOR STORAGE TESTS

| Reaction number | Wt. percent Na₂S₂O₄ | Wt. percent NaOH [1] | Storage temp. °F. | 10 days | pH | 20 days | pH | 30 days | pH | 40 days | pH |
|---|---|---|---|---|---|---|---|---|---|---|---|
| 718-228-VII | [3] 30 | 1.38 | 67 | [4] 3.63 | 9.8 | 95.7 | 6.1 | | | | |
| 718-242 | [3] 30 | 1.38 | 50 | 12.8 | 9.9 | | | 96.4 | 6.1 | | |
| 718-172 | [3] 30 | None | 35 | 2.6 | | 3.7 | 9.4 | 4.5 | 9.1 | | |
| 718-240-I | [5] 10 | 11.0 | 67 | 9.9 | 11.8 | [6] 15.5 | | 20.6 | 12.7 | 27.5 | 12.2 |
| 718-238-I | [5] 10 | 11.0 | 50 | 6.5 | 11.8 | [6] 11.2 | | 14.4 | 11.8 | 18.2 | 13.0 |
| 718-236-I | [5] 10 | 11.0 | 35 | 4.5 | 12.2 | [6] 6.3 | | 7.5 | 13.7 | 5.4 | 13.4 |

[1] Additional NaOH added on weight percent basis of Na₂S₂O₄.
[2] pH of 30% slurries taken on 10% solution after dilution.
[3] Zinc dithionite derived Na₂S₂O₄ was added to plant liquor to make 30%.
[4] Storage time 11 days.
[5] Diluted sodiation liquor to 10% Na₂S₂O₄.
[6] Storage time 19 days.

STORAGE TESTS

In storage tests conducted in respectively 5 and 20 gallon containers, it was found that the 10% dithionite solution was more easily handled than a 15% and above solution, the latter developing needle-like crystals of sodium dithionite dihydrate which are difficult to redissolve. With respect to long term storage of larger quantities, as for example, in 25 gallon and above containers, careful attention must be given to the temperature control, for in temperatures above 50° F., significant decomposition of the dithionite will occur, notwithstanding the addition of the caustic, after an extended period of time. Preferably, the temperature should be maintained at approximately 35° F. The caustic levels should not be excessive, preferably at 5% to 10% based on the dithionite present. Preferably, the containers are formed of an inert, non-reactive substance such as polyethylene to avoid synergism between the container and any dithionite impurities such as might hasten decomposition and/or adversely affect the bleaching potential of the sodium dithionite.

What is claimed is:

1. A method to stabilize aqueous solutions of sodium dithionite against decomposition during storage thereof comprising the steps of:
   (A) preparing a dilute aqueous solution having a concentration of 5.0% to 30.0% of sodium dithionite;
   (B) maintaining the pH factor of the aqueous solution at 9.0 to 13.0, by adding caustic soda to the aqueous solution of sodium dithionite, the concentration of caustic soda being at 1.38% to 20.0% by weight thereof, relative to the concentration of sodium dithionite in solution, while
   (C) controlling the storage temperature within the range of 35° F. to 135° F.

2. The method according to claim 1 wherein the pH is maintained between 10 and 12.

3. The method according to claim 1 wherein the temperature is maintained in the range from 35° F. to 50° F.

4. The method according to claim 1 wherein the concentration of caustic soda in solution is from 5.5% to 11% by weight of the concentration of sodium dithionite.

5. The method according to claim 1 wherein the solution comprises a concentration of sodium dithionite by weight between 5% and 12%.

References Cited

UNITED STATES PATENTS 2,226,576   12/1940   Park et al. ---------- 423—515

EARL C. THOMAS, Primary Examiner

U.S. Cl. X.R.

252—188; 423—515